(12) United States Patent
Wang

(10) Patent No.: US 6,597,589 B2
(45) Date of Patent: Jul. 22, 2003

(54) POWER CONVERTER

(75) Inventor: Kuo-Jung Wang, Taoyuan Shien (TW)

(73) Assignee: Delta Electronics, Inc., TaoYuan (TW)

( * ) Notice: Subject to any disclaimer, the term of this patent is extended or adjusted under 35 U.S.C. 154(b) by 0 days.

(21) Appl. No.: 10/017,615

(22) Filed: Dec. 14, 2001

(65) Prior Publication Data

US 2003/0112642 A1 Jun. 19, 2003

(51) Int. Cl.[7] .............................................. H02M 3/335
(52) U.S. Cl. ................................. 363/21.18; 363/21.15
(58) Field of Search ............................... 363/20, 21.01, 363/21.12, 21.15, 21.16, 21.17, 21.18, 95, 97, 131

(56) References Cited

U.S. PATENT DOCUMENTS 5,012,401 A * 4/1991 Barlage ........................ 363/97
5,675,485 A * 10/1997 Seong ......................... 363/97
6,125,046 A * 9/2000 Jang et al. .................... 363/49
6,324,079 B1 * 11/2001 Collmeyer et al. ......... 363/21.15

* cited by examiner

Primary Examiner—Matthew Nguyen
(74) Attorney, Agent, or Firm—Klein, O'Neill & Singh, LLP

(57) ABSTRACT

A power converter, and more particularly a switched AC/DC converter, is provided with an input current shaping (ICS) function. The ICS function is carried out by adjusting the conducting angle of the input current for a rectifier coupled to a central tap of a main transformer, thereby obtaining a higher power factor. Owing to the action of the ICS, the ripples in the feedback signal are usually larger. The ripples are used to modulate the switching frequency to effectively disperse and planarize the electromagnetic energy distribution of the power supply, and to suppress the electromagnetic interference problems of the power supply.

4 Claims, 6 Drawing Sheets

POWER CONVERTER

FIELD OF THE INVENTION

The present invention is related to a power converter, and more particularly, the present invention is related to a frequency modulation circuit which implements the input-current shaping function at the central tap of the transformer in a power supply.

BACKGROUND OF THE INVENTION

With the increasing awakenings to the importance of environmental protection, several regulations regarding the harmonics generated by the power supply are prescribed by the known EN 61000—3-2 specification. In order to abate the harmonics generated by the power supply, the power supply designer has made a great number of attempts to find ways to adjust the input current waveform of the capacitive filter circuit in the power supply, such that it could closely approach a sinusoidal wave. Because the active power factor corrector is used to adjust the input current waveform to improve its power factor, it is applicable to abate the harmonics of the power supply so as to comply with the requirements of the EN 61000-3-2 specification. However, because the active power factor corrector is quite complicated in circuit design and is high—priced, the so—called single—stage single—switch input—current-shaping (S4ICS) technique is thereupon presented. An example of the S4ICS circuit is shown in the center-tapped circuit including L1, L2, D1, D2 and T1 in FIG. 1 (wherein L denotes inductor, D denotes diode and T denotes transformer). Nevertheless, the low-cost S4ICS circuit also introduces another problem to the power supply designer at the same time. As indicated in FIG. 1, the conducting angle of the bridge rectifier 12 can be effectively magnified by means of the on/off operations of the diodes D1 and D2, thus enhancing the power factor of the input power. When the diode D2 is on, the input current is not filtered by the filtering capacitor Cb, but is directly connected to the bridge rectifier 12. Because the input voltage is lower than the voltage across the filtering capacitor Cb at this moment, the switching current will be larger and therefore the electromagnetic interference (EMI) will get more serious. As a result, an EMI filter of a better quality must be employed to the power supply, which prevents the cost of the power supply from decreasing.

Virginia Power Electronics Center (VPEC) has addressed an essay entitled "Reduction of Power Supply EMI Emission by Switching Frequency Modulation" at the VPEC Tenth Annual Power Electronics Seminar in 1992, and in that essay it presents a solution to effectively planarize the frequency spectrum, distribution of the noise. A circuit design scheme which makes use of the intrinsic characteristics of the S4ICS circuit to integrate the frequency modulation circuit into the EMI solution based on the S4ICS circuit is substantially proposed in the present invention.

SUMMARY OF THE INVENTION

The present invention provides a frequency modulation circuit for a power converter, especially for a switched AC/DC converter provided with input-current shaping (ICS) function. The ICS function is carried out by adjusting the conducting angle of the input current of the rectifier in virtue of the central tap of the main transformer to obtain a higher power factor. Owing to the actions of the ICS, the ripples of the feedback signal will certainly be larger. The present invention utilizes the ripples of the feedback signal to modulate the switching frequency of the power supply, so as to effectively disperse and planarize the energy distribution of the power supply and suppress the EMI problems of the power supply.

The switched AC/DC converter provided with ICS function as described hereinbefore broadly comprises a rectifier and a center-tapped transformer, in which one end of the primary winding of the center-tapped transformer is coupled to a storage capacitor, and the other end is coupled to a switch. The central tap of the center-tapped transformer is coupled to an input-current shaping circuit. The input-current shaping circuit, the rectifier, the storage capacitor and the central tap of the center-tapped transformer form an electric connection to allow the central tap of the center-tapped transformer to accomplish the input-current shaping function.

The switched AC/DC converter provided with ICS function as described hereinbefore further comprises a feedback circuit which outputs a feedback signal to a pulse width modulation control circuit and a frequency-sampling circuit according to the magnitude of the output load of the converter. The frequency-sampling circuit has one end coupled to the feedback circuit and another end coupled to a frequency-generating circuit. The switched AC/DC converter provided with ICS function in accordance with a preferred embodiment of the present invention comprises a frequency-generating circuit which outputs a corresponding frequency value to the pulse width modulation control circuit in response to a signaling level of the feedback signal. The pulse width modulation control circuit controls the on/off operations of the switch in response to the feedback signal from the feedback circuit. The energy of the converter then can be successfully conveyed from the primary winding of the center-tapped transformer to other windings by way of the on/off operations of the switch.

Now the foregoing and other features and advantages of the present invention will be more clearly understood through the following descriptions with reference to the drawings, in which:

DETAILED DESCRIPTION OF THE PREFERRED EMBODIMENTS

A preferred embodiment of the present invention will now be described in detail by way of the following discussions with reference to the accompanying drawings.

Figure 2:
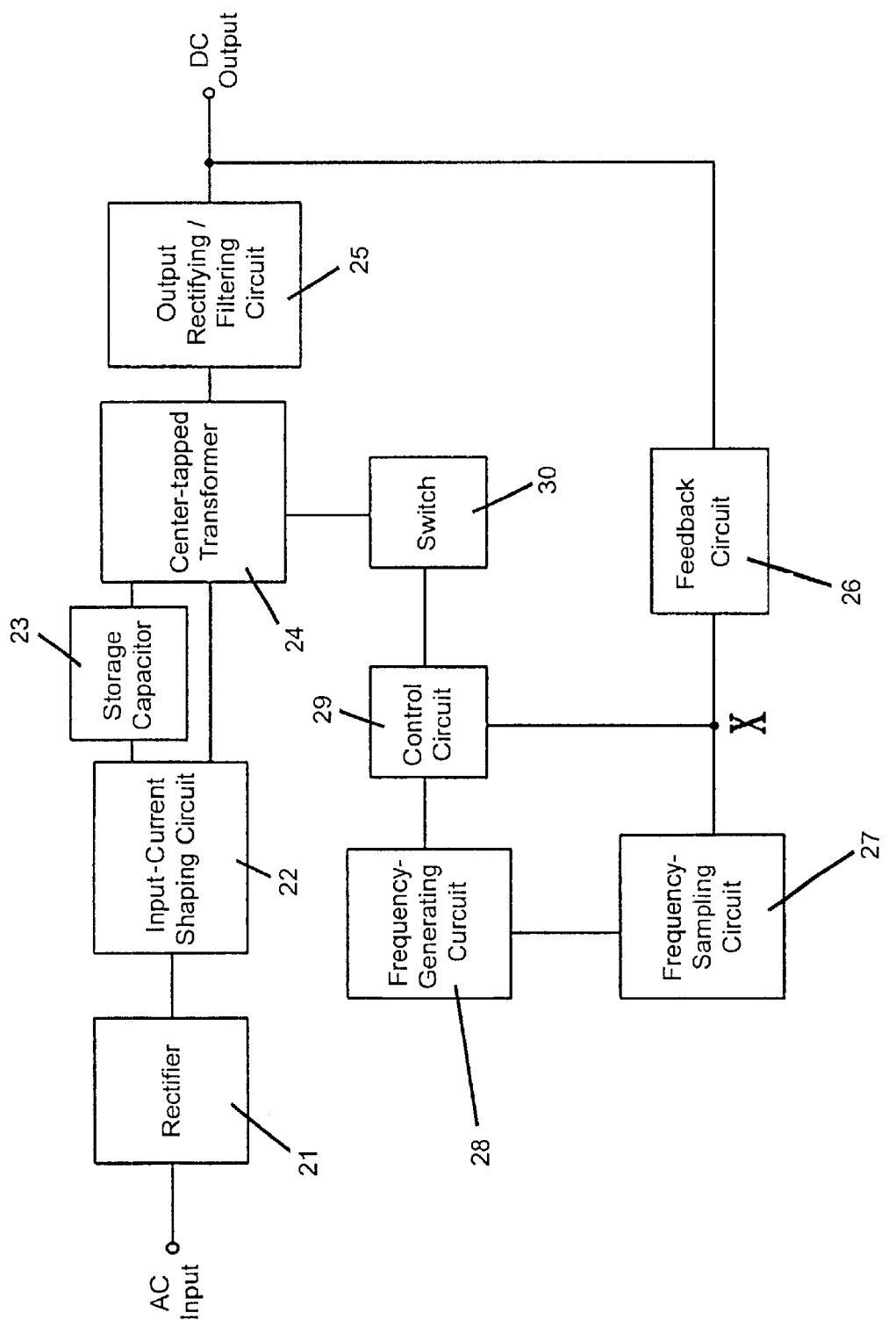
FIG. 2 is a functional block diagram showing one embodiment of the present invention.
Figure 3:
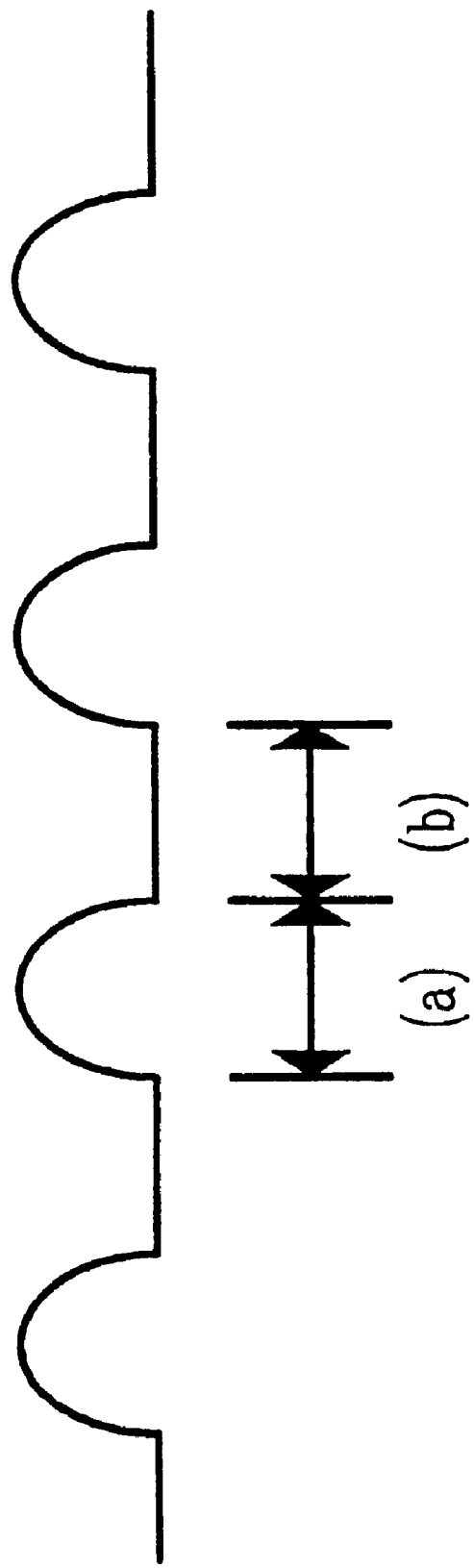
FIG. 3 shows the waveform of the feedback signal at the node X in FIG. 2.

Referring to FIG. 2, the power converter in accordance with one embodiment of the present invention roughly comprises a rectifier 21, an input-current shaping circuit 22, a storage capacitor 23, a center-tapped transformer 24, an output rectifying/filtering circuit 25, a feedback circuit 26, a frequency-sampling circuit 27, a frequency-generating circuit 28, a control circuit 29 and a switch 30. One end of the primary winding of the center-tapped transformer 24 is coupled to the storage capacitor 23, and the other end is coupled to the switch 30. The central tap of the transformer 24 is coupled to the input-current shaping circuit 22. The input-current shaping circuit 22, the rectifier 21, the storage capacitor 23 and the center-tapped transformer 24 are electrically coupled to form an electric connection for allowing the central tap of the center-tapped transformer 24 to accomplish the input current shaping function. Besides, the feedback circuit 26 outputs a feedback signal to the control circuit 29 and the frequency—sampling circuit 27 in response to the magnitude of the output load of power converter. One end of the frequency-sampling circuit 27 is electrically coupled to the frequency-generating circuit 28. The frequency—generating circuit 28 supplies a corresponding frequency value to the control circuits 29 in accordance with the outputs of the frequency—sampling circuit 27. The control circuit 29 is preferably designated to as a pulse width modulation control circuit, which controls the on/off operations of the switch 30 according to the feedback signal generated by the feedback circuit 26. The energy of the power converter can be conveyed from the primary winding of the transformer 24 to other windings by means of the on/off operations of the switch 30. The present invention is characterized by that the frequency-generating circuit 28 outputs a corresponding frequency value to the control circuit 29, which employs the waveform of the feedback signal from the feedback circuit 26 as shown in FIG. 3 (which is the voltage waveform of the feedback signal at node X in FIG. 2) to perform frequency modulation to the control circuit 29, and effectively overcomes the drawbacks that the energy of the electromagnetic harmonics are too concentrated.

Figure 1:
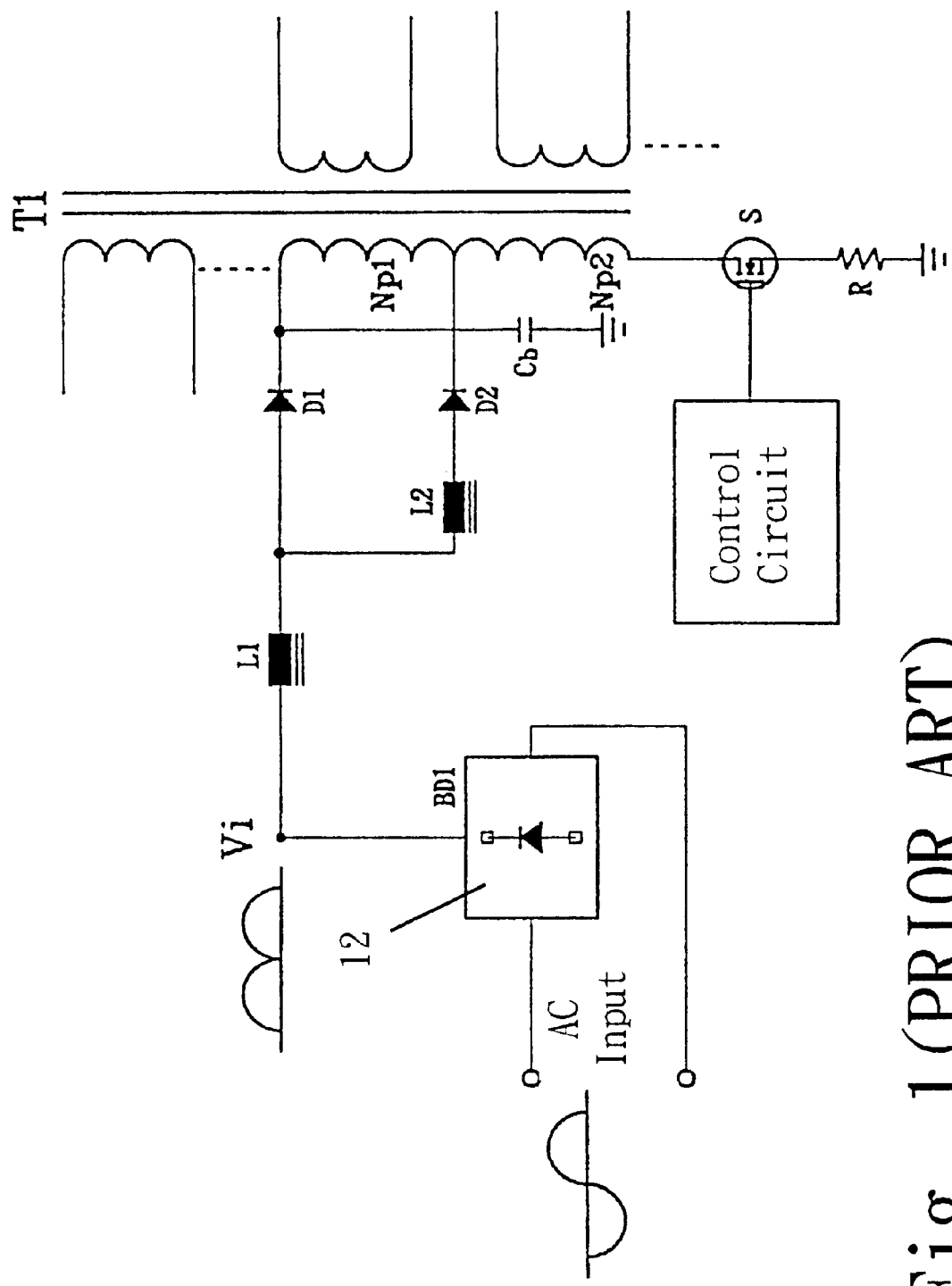
FIG. 1 is a circuit topological view showing a prior art switched AC/DC converter provided with input current shaping function, which is addressed by Virginia Power Technologies, Inc.
Figure 4:
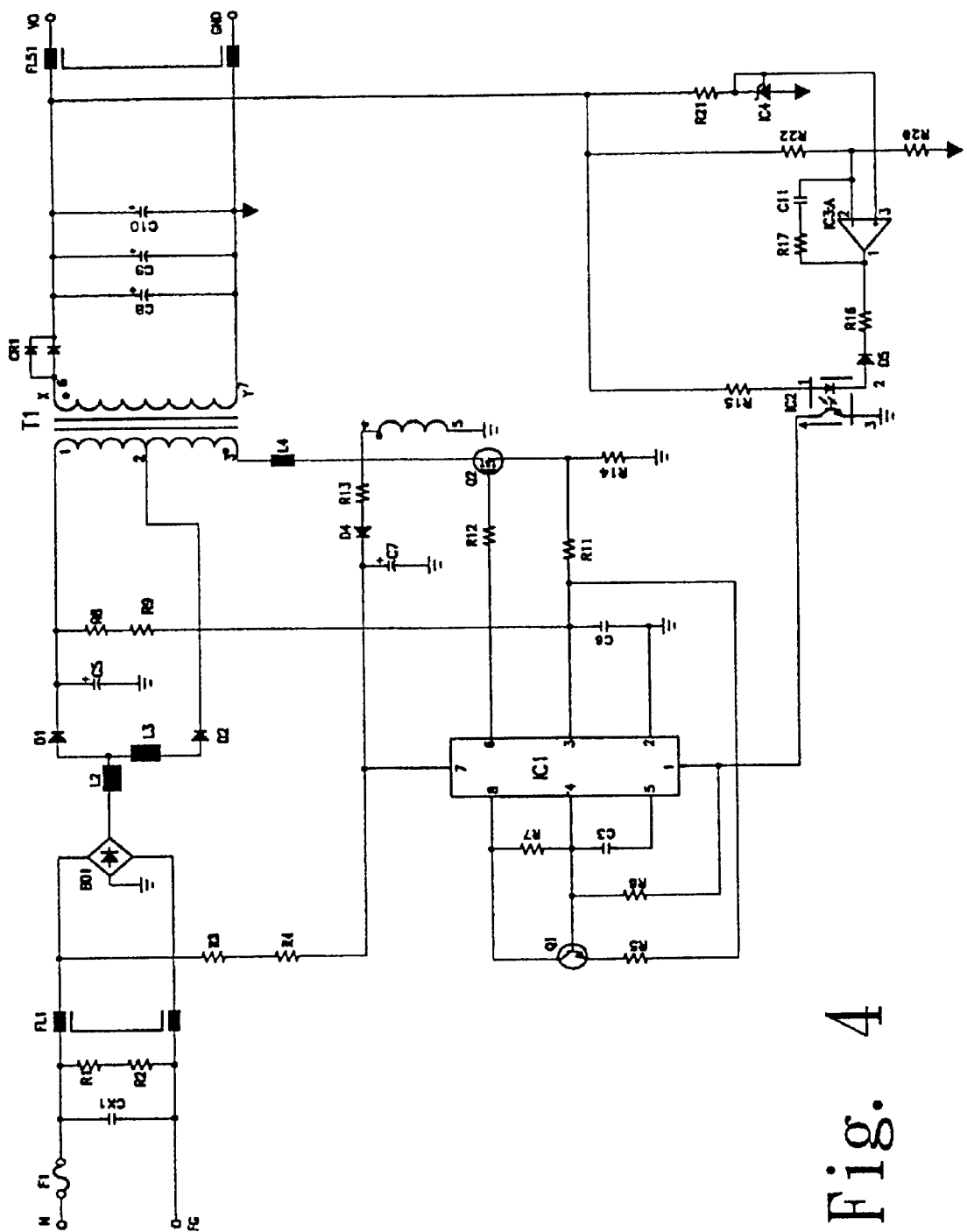
FIG. 4 depicts a circuit diagram of a preferred embodiment of the present invention.

FIG. 4 is a circuit diagram showing a preferred embodiment of the present invention. In a common closed-loop power supply system, the forward current of the switch will be varied with the magnitude of the input voltage (the forward current is large while the input voltage is small, and the forward current is small while the input voltage is large). Consequently, the signal waveform for modulating the current in a switched power supply system (such as the feedback voltage signal at the node X in FIG. 2) will have a waveform like that as shown in FIG. 3. The frequency of the feedback signal of the waveform in FIG. 3 is twice the AC input frequency (full-wave rectification), wherein segment (a) indicates that D2 is on, and $(Vcb) \times [(Np2)/(Np1+Np2)] < Vi$, and segment (b) indicates that D1 is on, and $(Vcb) \times [(Np2)/(Np1+Np2)] > Vi$ (where Vi, Vcb, Np1 and Np2 can be seen from FIG. 1).

Conspicuously, in the present invention, there is no need to place an extra frequency modulating circuit in the power converter; rather it includes a frequency-sampling circuit 27 which is implemented by a resistor R6 and a frequency—generating circuit 28 to directly perform the frequency modulation process according to the feedback signal waveform, thereby changing the switching frequency of the overall power supply. In this way, the electromagnetic harmonics of the power supply will be planarized (which means the noise will not concentrate at the switching frequency where harmonics take place). The feedback circuit 26 further includes a photo coupler 261 for performing an electric—optical-electric conversion operation to isolate a likely short-circuited current.

Figure 5A:
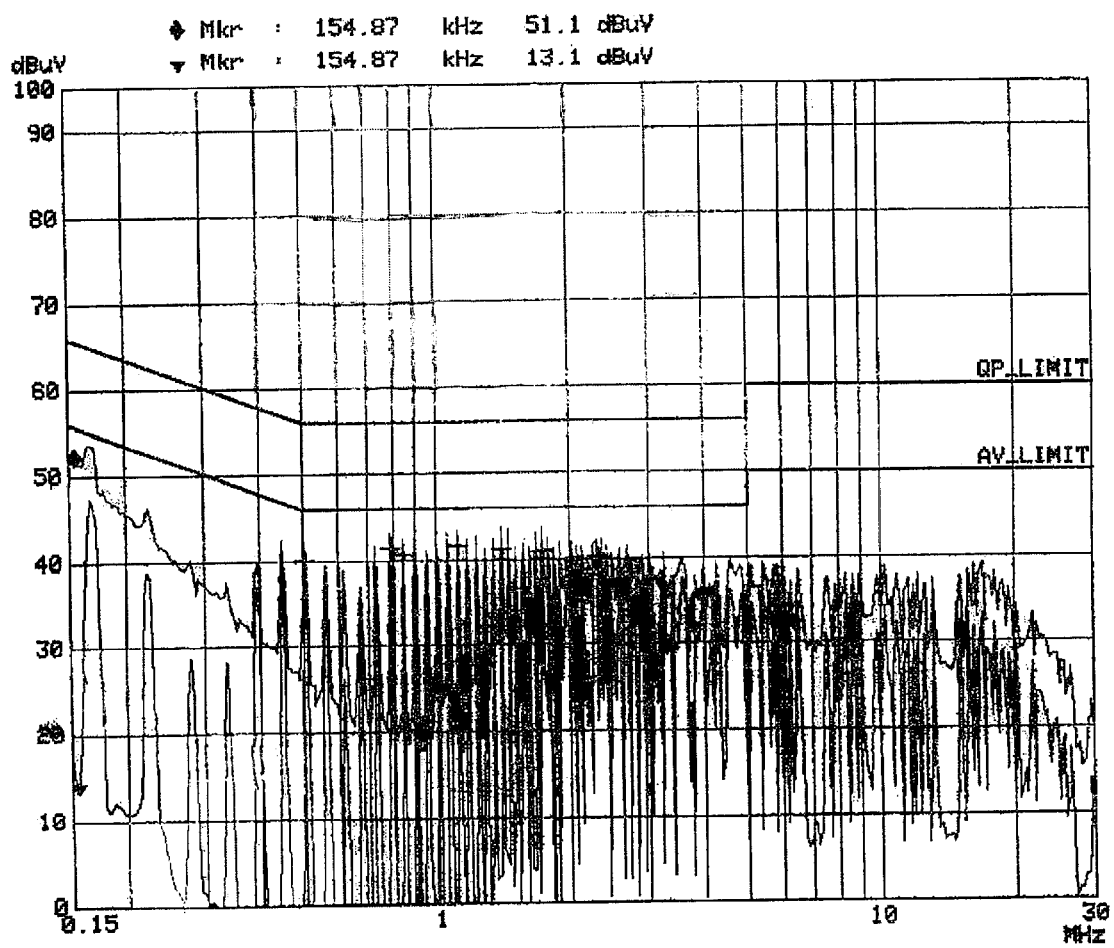
FIGS. 5(a) and 5(b) respectively exhibit the CISPR EMI testing results of the S4ICS circuit without the ICS function and with the ICS function.
Figure 5B:
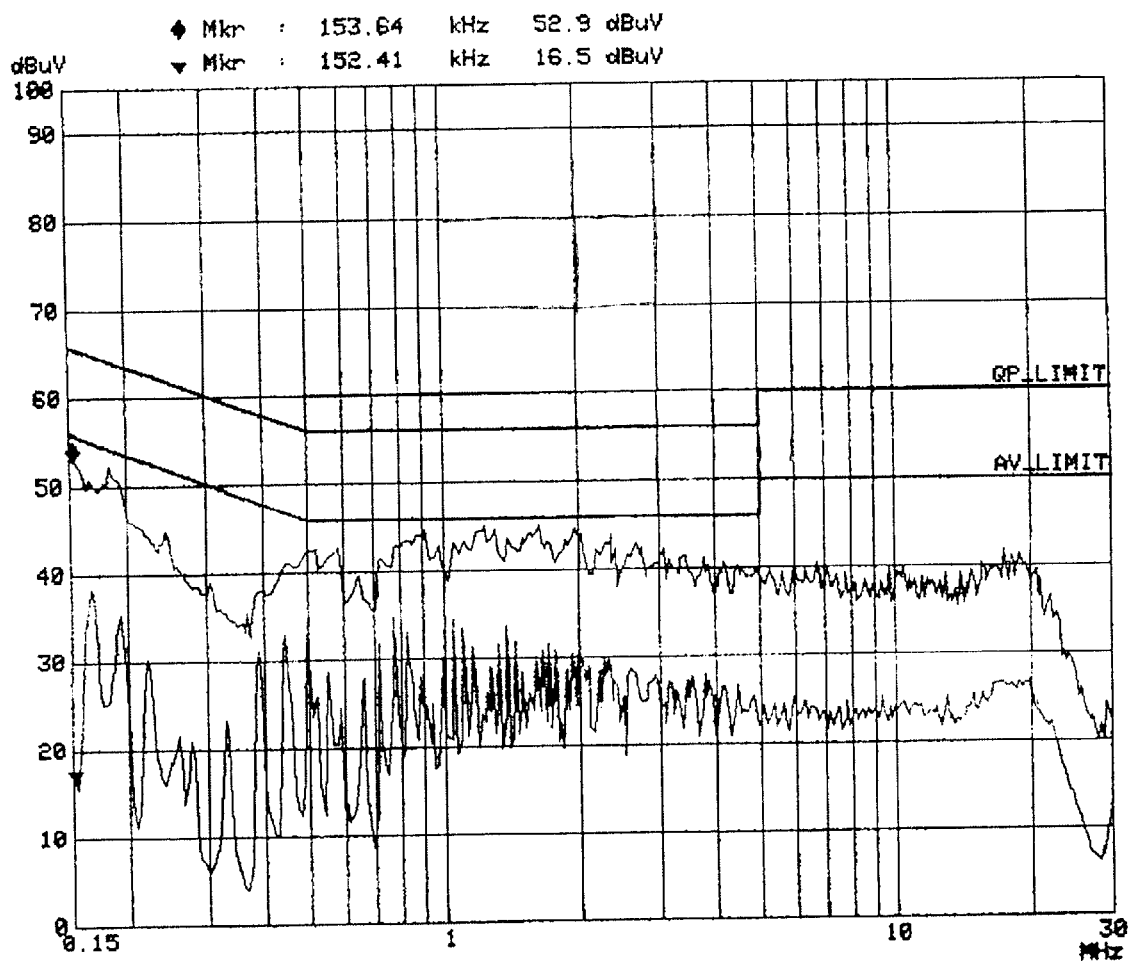

FIG. 5(a) and FIG. 5(b) respectively exhibit the CISPR EMI testing results of the S4ICS circuit without the ICS function and with the ICS function. It can be understood from the testing results of FIG. 5(a) and FIG. 5(b) that the concentration level and the peak value of the electromagnetic harmonics of the S4ICS circuit provided with ICS function according to the present invention (as shown in FIG. 5(b)) are far inferior to those of the prior art S4ICS switched power supply (as shown in FIG. 5(a)). Obviously, the present invention is capable of regulating the harmonics generated by the power supply to comply with the prescription of the EN61000-3-2 specification without the need of placing an extra frequency modulation circuit, resulting in a low-cost power converter.

Those of skill in the art will recognize that these and other modifications can be made within the spirit and scope of the invention as defined in the appended claims.

What is claimed is:

1. A power converter for converting an alternating-current power into a direct—current power for user by a load, comprising:

a rectifier having an input terminal for receiving said alternating—current power;

a single—stage single-switch input current shaping circuit coupled between an output terminal of said rectifier and said load, which outputs a direct—current voltage signal in response to the magnitude of said load;

a feedback circuit coupled to an output terminal of said single-stage single-switch input current shaping circuit for converting said direct-current voltage signal into a feedback signal for output, wherein said feedback circuit further comprises a frequency-sampling circuit and a frequency-generating circuit;

a pulse width modulation control circuit coupled with said single-stage single-switch input current shaping circuit and said feedback circuit, which outputs a pulse width modulation signal to said single-stage single—switch input current shaping circuit in response to a signaling level of said feedback signal; and a frequency modulation circuit coupled between said pulse width modulation control circuit and said feedback circuit, which performs a frequency modulation process to said pulse width modulation signal according to said feedback signal to abate an energy concentration effect of the electromagnetic harmonics of said power converter.

2. The power converter as recited in claim 1 wherein said feedback circuit comprises a photo coupler which performs an electric-optical-electric conversion operation for isolating a short-circuited current between said frequency modulation circuit and said single-stage single-switch input current shaping circuit.

3. The power converter as recited in claim 1 wherein both said frequency sampling circuit and said frequency generating circuit comprise a resistor coupled between said pulse width modulation control circuit and said feedback circuit.

4. The power converter as recited in claim 3 wherein said single-stage single-switch input current shaping circuit comprises:

an input-current shaping circuit;

a storage capacitor;

a center-tapped transformer; and a switch, wherein said one end of a primary winding of said center-tapped transformer is coupled to said storage capacitor and the other end of said primary winding of said center-tapped transformer is coupled to said switch, and a central tap of said center-tapped transformer is coupled to said input-current shaping circuit;

wherein said input-current shaping circuit, said rectifier and said central tap of said center-tapped transformer form an electric connection to allow said central tap of said center-tapped transformer to accomplish an input-current shaping process.

\* \* \* \* \*